(12) United States Patent
Kranz (10) Patent No.: US 6,940,940 B2
(45) Date of Patent: Sep. 6, 2005

(54) ELECTRONIC HUBODOMETER

(75) Inventor: Mark J. Kranz, Hallsville, TX (US)

(73) Assignee: Stemco Delaware LP, Longview, TX (US)

( * ) Notice: Subject to any disclaimer, the term of this patent is extended or adjusted under 35 U.S.C. 154(b) by 15 days.

(21) Appl. No.: 10/697,743

(22) Filed: Oct. 30, 2003

(65) Prior Publication Data

US 2004/0083811 A1 May 6, 2004

Related U.S. Application Data (60) Provisional application No. 60/422,244, filed on Oct. 30, 2002, and provisional application No. 60/443,147, filed on Jan. 28, 2003.

(51) Int. Cl.$^7$ .............................................. G01C 21/00
(52) U.S. Cl. ...................................................... 377/24.1
(58) Field of Search ........................................ 377/24.1

(56) References Cited

U.S. PATENT DOCUMENTS

| | | | |
|---|---|---|---|
| 2,727,221 A | 12/1955 | Sprigg | |
| 3,723,966 A | 3/1973 | Mueller et al. | |
| 3,735,103 A | 5/1973 | Finley | |
| 3,806,905 A | 4/1974 | Strenglein | |
| 4,009,619 A | 3/1977 | Snyman | |
| 4,145,605 A | 3/1979 | Marcus | |
| 4,229,724 A | 10/1980 | Marcus | |
| 4,328,413 A | 5/1982 | O'Neil et al. | |
| 4,337,392 A | 6/1982 | Baker | |
| 4,570,228 A | 2/1986 | Ahlberg | |
| 4,574,267 A | 3/1986 | Jones | |
| 4,609,905 A | 9/1986 | Uzzo | |
| 4,685,116 A | 8/1987 | Toumayan | |
| 4,688,244 A | 8/1987 | Hannon et al. | |
| 4,697,278 A | * 9/1987 | Fleischer | .................... 377/24.1 |
| 4,862,486 A | 8/1989 | Wing et al. | |
| 4,937,581 A | 6/1990 | Baldwin et al. | |
| 4,940,976 A | 7/1990 | Gastouniotis et al. | |
| 4,989,222 A | 1/1991 | Lutts et al. | |
| 5,003,704 A | 4/1991 | Schubert | |
| 5,218,343 A | 6/1993 | Stobbe et al. | |
| 5,349,520 A | 9/1994 | Hickman | |
| 5,524,034 A | 6/1996 | Srygley et al. | |
| 6,011,827 A | * 1/2000 | Kyrtsos | ..................... 377/24.1 |
| 6,034,615 A | 3/2000 | Srygley et al. | |
| 6,064,705 A | * 5/2000 | Zalud et al. | ................. 375/361 |

(Continued)

FOREIGN PATENT DOCUMENTS

| | | |
|---|---|---|
| EP | 0 517 082 A2 | 12/1992 |
| GB | 1 452 029 | 10/1976 |
| GB | 2 242 527 | 10/1991 |
| GB | 2 307 044 A | 5/1997 |
| WO | WO 00 50846 | 8/2000 |

OTHER PUBLICATIONS

English Translation of EP 0517082, Dec. 9, 1992.*
International Search Report mailed Mar. 15, 2004 corresponding to PCT/US 03/34383.

*Primary Examiner*—Margaret R. Wambach
(74) *Attorney, Agent, or Firm*—John M. Harrington; Kilpatrick Stockton LLP (57) ABSTRACT

An apparatus and method for counting wheel revolutions are provided that include a wheel-hub mountable odometer comprising an accelerometer comprising sensor means for sensing force, wherein the sensor means are operable to sense a force acting thereon and generate an electrical signal representative of said force. Further an electronic control system is provided comprising a microcontroller and power source, the microcontroller comprising electronic filtering means for attenuating irregularities in the signal from the sensor means and computing a wheel revolution count based on said attenuated signal, and output means for communicating the wheel revolution count. The accelerometer preferably comprises a dual axis electronic accelerometer with no internally rotating parts. Further, the output means preferably comprises at least one of a display means, an IR communication system, or a RF communications system.

30 Claims, 10 Drawing Sheets

U.S. PATENT DOCUMENTS

| | | |
|---|---|---|
| 6,232,767 B1 | 5/2001 | Kawase et al. |
| 6,259,361 B1 | 7/2001 | Robillard et al. |
| 6,308,134 B1 | 10/2001 | Croyle et al. |
| 6,438,193 B1 * | 8/2002 | Ko et al. .................. 377/24.1 |
| 6,547,128 B1 | 4/2003 | Shimura |
| 6,758,089 B2 * | 7/2004 | Breed et al. .................. 73/146 |
| 2003/0048178 A1 | 3/2003 | Bonardi et al. |

* cited by examiner

FIG. 7: Raw Accelerometer Data

FIG. 8: XY Acceleration Plot

FIG. 9: XY Acceleration Plot

FIG. 10: Comparison of Odometers

ELECTRONIC HUBODOMETER

CROSS REFERENCE TO RELATED APPLICATIONS

This application claims the benefit of U.S. Provisional Patent Application No. 60/422,244, filed Oct. 30, 2002, and U.S. Provisional Patent Application No. 60/443,147, filed Jan. 28, 2003, both of which are incorporated by reference.

FIELD OF THE INVENTION

This invention relates to wheel-hub mounted odometers. More particularly, this invention relates to electronic hubodometers with no internal rotating parts or mechanical counters. This invention further relates to a system and method for transmitting hubodometer information to a remote location using a radio frequency (RF) communication system.

BACKGROUND OF THE INVENTION

Fleet maintenance agreements, leasing agreements and/or certain governmental regulations require the use of a device to accurately record the distance traveled by a commercial vehicle. One device, commonly known as a hubodometer, is typically bolted or otherwise attached to a wheel hub of the vehicle where it senses rotation of the wheel, the sensed rotation being correlated with distance traveled. In that this distance information is used for determining highway usage fees as well as for compliance with contractual agreements, it is imperative that the recording device be manufactured in a manner which prevents intentional or inadvertent alteration of the distance information. It is also imperative that the recording device be immune to transient movements of the device such that such movements are not interpreted as a rotation of the wheel hub.

This problem has been solved by using a weighted mechanical assembly that sits on the end of the axle of the trailer. As the wheel turns, the weighted assembly stays stationary. This provides a relative motion that can drive a geared odometer. The problems with this method are that vibration can induce spin into the weighted assembly which makes the unit stop counting since there is no longer any relative motion with respect to the wheel to turn the internal gears. This forces the unit to inherently undercount overtime. Another limitation to this method is that every wheel needs different parts and gears so that mileage is displayed correctly on different wheel sizes. Not all wheel sizes can be supported in this manner though. A further limitation relates to the effect of wheel impacts when driving over rough surfaces or rocks. These impacts can impart inaccuracies into the odometer count.

Figure 1:
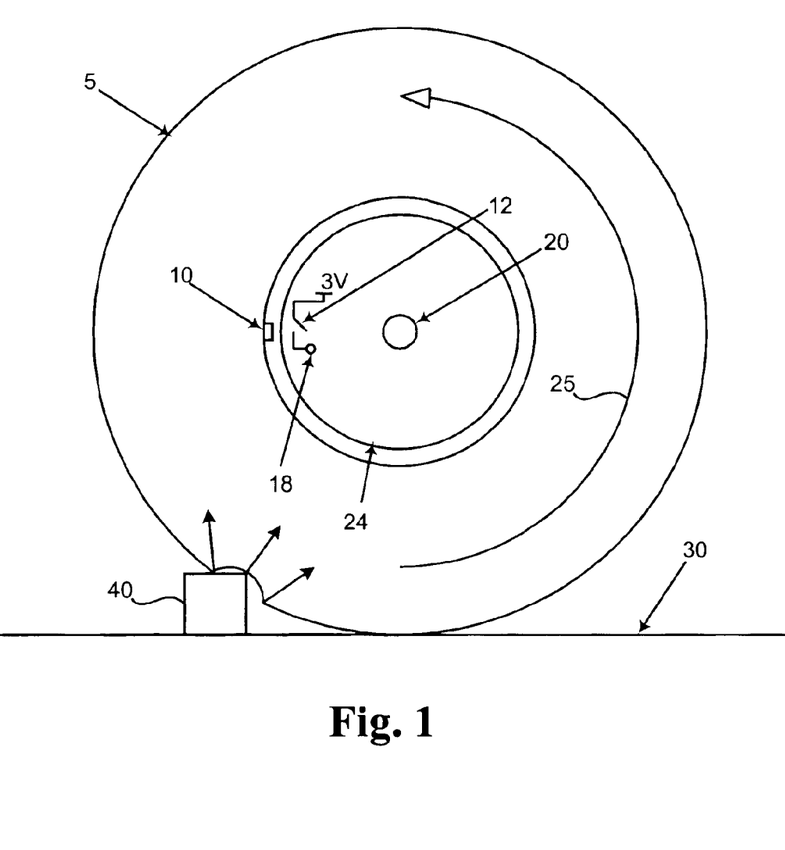
FIG. 1 shows a schematic view of a hubodometer commonly found in the prior art.

In the past solutions have been proposed including an electronic solution to the gearing problems. This is shown in FIG. 1. The gearing on the weighted assembly 24 is replaced with a magnet 10 mounted on the rotating portion and one or more magnetic switches 12 mounted on the weighted assembly 24. As the wheel 5 rotates in a counter clockwise direction as indicated by the arrow 25, over a surface 30, the magnetic switch 12 closes to provide an electrical impulse to the counter 18 when the magnet 10, rotating with the wheel 5, rotates past the switch 12.

This configuration solves the problems of gear ratios since software defines the counts per mile now; however, the unit still has essentially all the same mechanical components to keep the weighted assembly from spinning. This leads to more cost on a unit that still has the same failure modes plus a few new ones such as rocking and battery life problems. There still exists the problem of road impacts 40 disturbing the counting mechanism 18.

It would therefore be beneficial to have an electronic hubodometer with no moving internal parts, capable of accurately tracking mileage while minimizing distortions due to wheel impacts and vibrations.

It would be further beneficial to monitor hubodometer data from a location remote from the wheel. Preferable locations would include inside the passenger compartment of the vehicle; from a hand held monitor; or from a building proximate to where the vehicle is stored. When working with a fleet of vehicles, it would further be beneficial to provide hubodometer information on a network where it is accessible from a plurality of locations. These include the Internet and cellular or satellite monitoring systems.

SUMMARY OF THE INVENTION

In a first aspect of the present invention, a wheel-hub mountable odometer is provided comprising an accelerometer comprising sensor means for sensing force, wherein the sensor means are operable to sense a force acting thereon and generate an electrical signal representative of said force. Further, an electronic control system is provided comprising a microcontroller and power source, the microcontroller comprising electronic filtering means for attenuating irregularities in the signal from the sensor means and computing a wheel revolution count based on said attenuated signal, and output means for communicating the wheel revolution count. The accelerometer preferably comprises a dual axis electronic accelerometer with no internally rotating parts. Further, the output means preferably comprises at least one of a display means, an IR communication system, or an RF communications system.

In a second aspect of the present invention a method for counting wheel revolutions is provided comprising, attaching an electronic accelerometer to a wheel, the accelerometer comprising sensor means for sensing a force acting on the accelerometer and generating an electronic signal proportional to the force, and providing an electronic control system functionally connected to the accelerometer, comprising means for converting the accelerometer signal into a wheel revolution count wherein the signal generated by the accelerometer is sent to the electronic control system which computes odometer data comprising the wheel revolution count based on the signal from the accelerometer.

Figure 10:
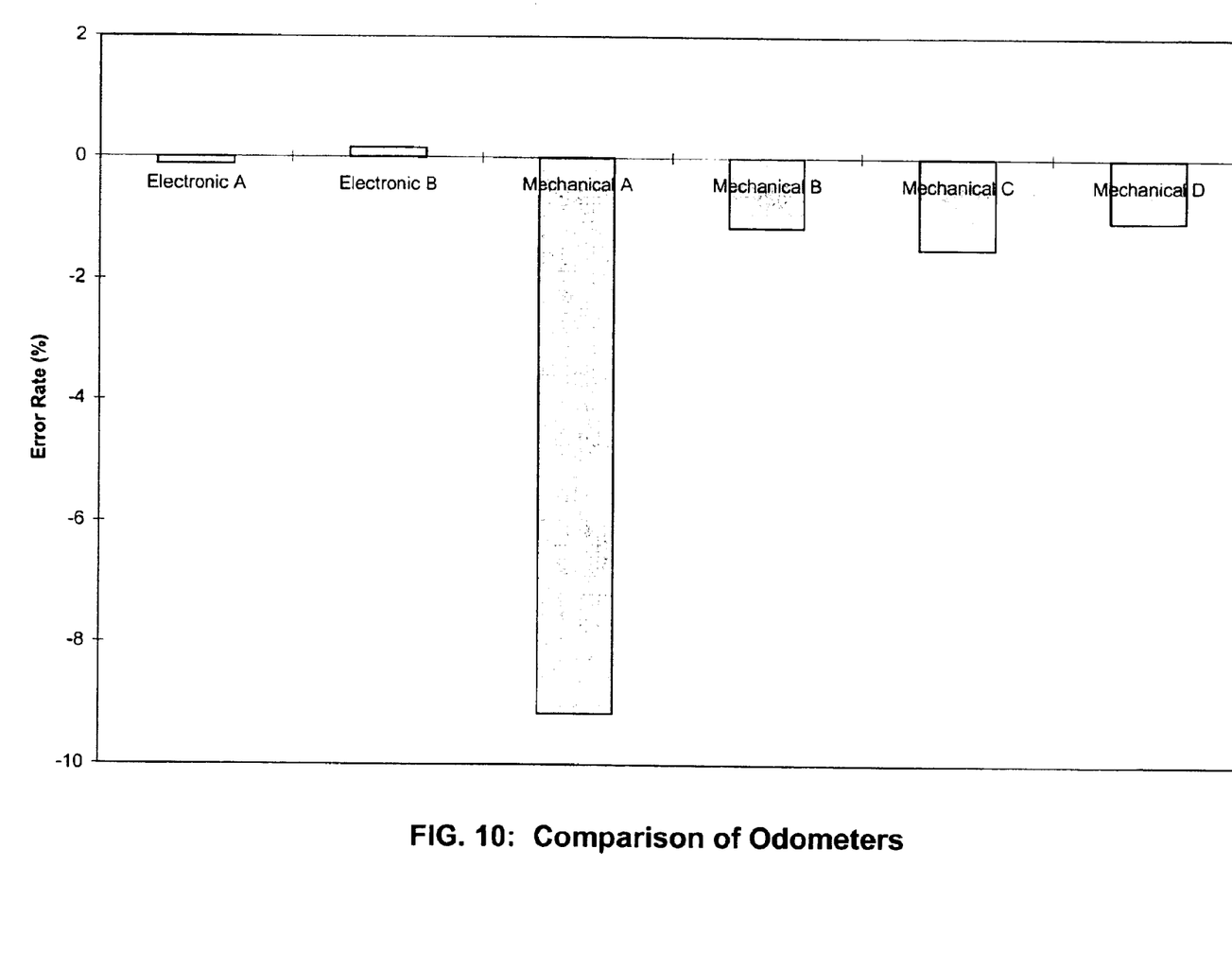
FIG. 10 is a comparison of error rates for a series of electronic and mechanical odometers.

One feature and advantage of the present invention is a more accurate odometer, which is less susceptible to miscounts due to vibration and road impacts. The data filtering and reconstruction techniques of the present invention greatly improve the accuracy of the odometer over prior art devices. As shown in FIG. 10, the odometers of the present invention, Electronic A and Electronic B, have significantly lower error rates as compared to commonly used mechanical odometers. Digital filtering of the electronic signal, as well as tracking and storing data such as velocity and acceleration allow for reconstruction of lost or irreconcilable accelerometer signals.

It is a feature and advantage of the present invention to provide an electronic hub-mounted odometer with no internal moving parts. This decreases wear on the system and prolongs the useful life of the odometer.

It is a further feature and advantage of the present invention to provide an electronic hubodometer that can self-correct for impacts and vibrations felt by the wheel.

An additional feature and advantage of the present invention comprises a means for extending battery life through adaptive power control techniques.

A feature and advantage of the present invention provides a means for communicating odometer information to a remote location, as well as providing instructions to the odometer.

Another feature and advantage of the present invention provides for an odometer fully enclosed and hermetically sealed in a housing. The extended life of the odometer and electrical components eliminate the need to access the internal components of the odometer, thereby maintaining the hermetic seal throughout the life of the apparatus.

DETAILED DESCRIPTION OF THE INVENTION

In a first aspect of the present invention, an electronic hubodometer is provided comprising a dual axis accelerometer mounted to a wheel hub. In further embodiments of the present invention, electronic components including a microcontroller and communication system means are provided to interpret the accelerometer signal, calculate odometer information, and communicate the data to a remote location.

In a preferred embodiment of the present invention, the accelerometer and electronic components of this system comprise a solid state system with no moving parts. Therefore, the product size is dictated only by the size of the display needed to read the mileage. This allows freedom in design of the surrounding enclosures, leading to a potential for cost reductions in the unit since one unit can work with all wheel sizes using the same components.

The odometer enclosure comprises two main components, a back-cup and front cover. The majority of wheel-mounted odometers utilize a back-cup made from metal with a plastic front cover. Methods for closure or assembly of the housing components include swaging, snapping, and using an external clamp. All methods require a seal to keep out moisture.

A preferred embodiment of the present invention comprises a plastic back-cup with an insert-molded stud. The insert is custom designed to react to external loads including rotation, bending, and axial thrust. The design of the back-cup also allows for maximum internal cavity space for the electronic components. While the back-cup is designed with strength in mind, it also contains features to limit battery movement and possible disconnection. The printed circuit board (PCB) is supported by the tops of strengthening ribs and sandwiched between the back-cup and front cover to lock it tightly in place. The front cover is held in place through ultrasonic welding to the back-cup. This provides a solid unit that eliminates the need for mechanical fastening of the PCB to any other component separately, and further creates a hermetic seal between the back-cup and front cover without the need of other sealing components.

Accelerometers come in many varieties including piezoelectric accelerometers which use piezoelectric crystals to produce an electric charge when a force is exerted under acceleration; a potentiometric accelerometer which uses displacement of a spring and mass linked to a wiper arm which moves across a potentiometer; a reductive accelerometer which uses an inductance bridge to produce an output voltage proportional to the movement of a mass by causing the inductances of two coils to vary in opposing directions; a strain gauge accelerometer, or piezoresistive accelerometer which uses strain gauges acting as arms of a Whetstone bridge to convert mechanical strain to DC voltage; a capacitive accelerometer in which a change in acceleration causes a change in the space between a moving and a fixed electrode; and a vibrating element accelerometer in which a small displacement of the mass varies the tension of a tungsten wire in a permanent magnetic field and current through the wire causes the wire to vibrate at a resonant frequency.

All accelerometers share the characteristic of measuring a force in a given direction. Positive accelerometer readings are indicative of a force applied in the direction of orientation of the accelerometer. Negative accelerometer readings are indicative of a force applied directly opposite or offset 180° from the direction of orientation of the accelerometer. In a preferred embodiment of the present invention, the accelerometer comprises a device capable of measuring a force applied thereto, with no internal moving parts.

In a most preferred embodiment of the present invention, the accelerometer sensor comprises a surface micromachined polysilicon structure built on top of the silicon wafer. Polysilicon springs suspend the structure over the surface of the wafer and provide a resistance against acceleration forces. Deflection of the structure is measured using a differential capacitor that consists of independent fixed plates and central plates attached to the moving mass. The fixed plates are driven by 180° out of phase square waves. An acceleration will deflect the beam and unbalance the differential capacitor, resulting in an output square wave whose amplitude is proportional to acceleration. Phase sensitive demodulation techniques are then used to rectify the signal and determine the direction of the acceleration.

In a preferred embodiment of the present invention, the accelerometer comprises a dual-axis accelerometer. Dual axis accelerometers have two sensors and measure force along two axes. In an alternate embodiment of the present invention, force is detected along two axes by mounting two unidirectional accelerometers along differing axis. Addition of the second axis of measurement is preferable, as this greatly simplifies the digital filtering required to reduce noise and vibrations.

The two axes of measurement in the present invention comprise any two directional vectors separated by an angle other than 180° or 360°. At an angle of separation comprising 180° the two detectors would measure the same force, but in opposite directions. Similarly, a separation angle of 360° would result in duplicative data. In a preferred embodiment of the present invention, the angle of separation comprises 90°, or similarly 270°. This angle of separation is preferred as it simplifies calculations and represents the greatest offset between the two readings. This increases the accuracy of the accelerometer measurements, and the accuracy of estimating missing data points when the accelerometer produces erratic signals due to large road impacts.

For the purposes of simplification of this discussion, the preferred dual axis accelerometer will be referenced including two detectors offset by an angle of 90°. Additionally, the accelerometer will be referenced from a position in the center of the wheel. However, in an alternate embodiment of the present invention, the accelerometer is positioned at a distance R from the center of the wheel.

Figure 2:
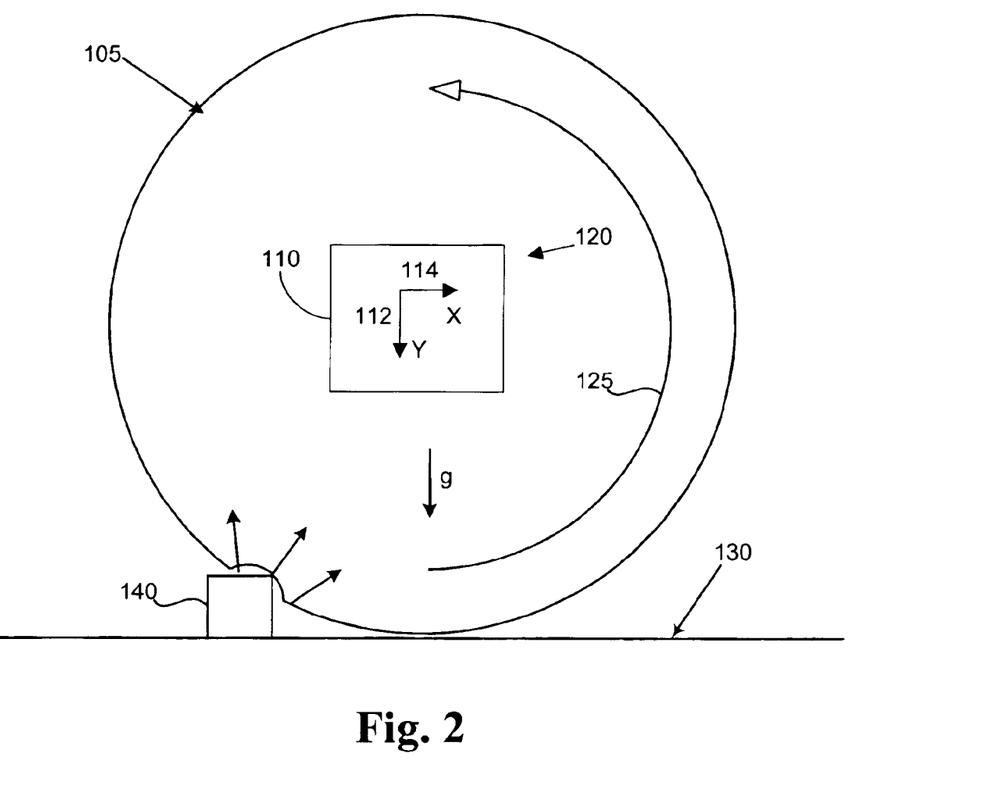
FIG. 2 shows a schematic view of a hubodometer of an embodiment of the present invention.

Referring to FIG. 2, a dual axis accelerometer 110 is placed at the center 120 of the wheel 105. The accelerometer detects force along two axes, an x-axis 114 and a y-axis 112 offset from the x-axis by 90°. As the wheel 105 rotates in a direction shown by the arrow 125, the orientation of the x-axis and y-axis will change with respect to the ground 130. Assuming a flat surface, the force of gravity (g) is felt in a direction perpendicular to the ground 130.

Before the wheel starts to turn the y-axis 112 of the accelerometer will detect the full force of gravity (1 g), and the x-axis 114 will not detect any force from gravity because the force is acting on the x-axis sensor perpendicular to the direction of detection (i.e. the force has no x-axis component). As the rotation begins in the direction indicated by the arrow 125, the accelerometer will detect decreasing values along the y-axis as the y-axis approaches an orientation perpendicular to the force of gravity. Simultaneously, the x-axis will detect an increasing force of gravity in a negative direction as it approaches an orientation parallel, but opposite to, the gravitational pull. After one-quarter turn of the wheel, the x-axis is oriented directly upward and detects −1 g of force. The y-axis would be perpendicular to the direction of gravity and would detect no force.

Figure 3:
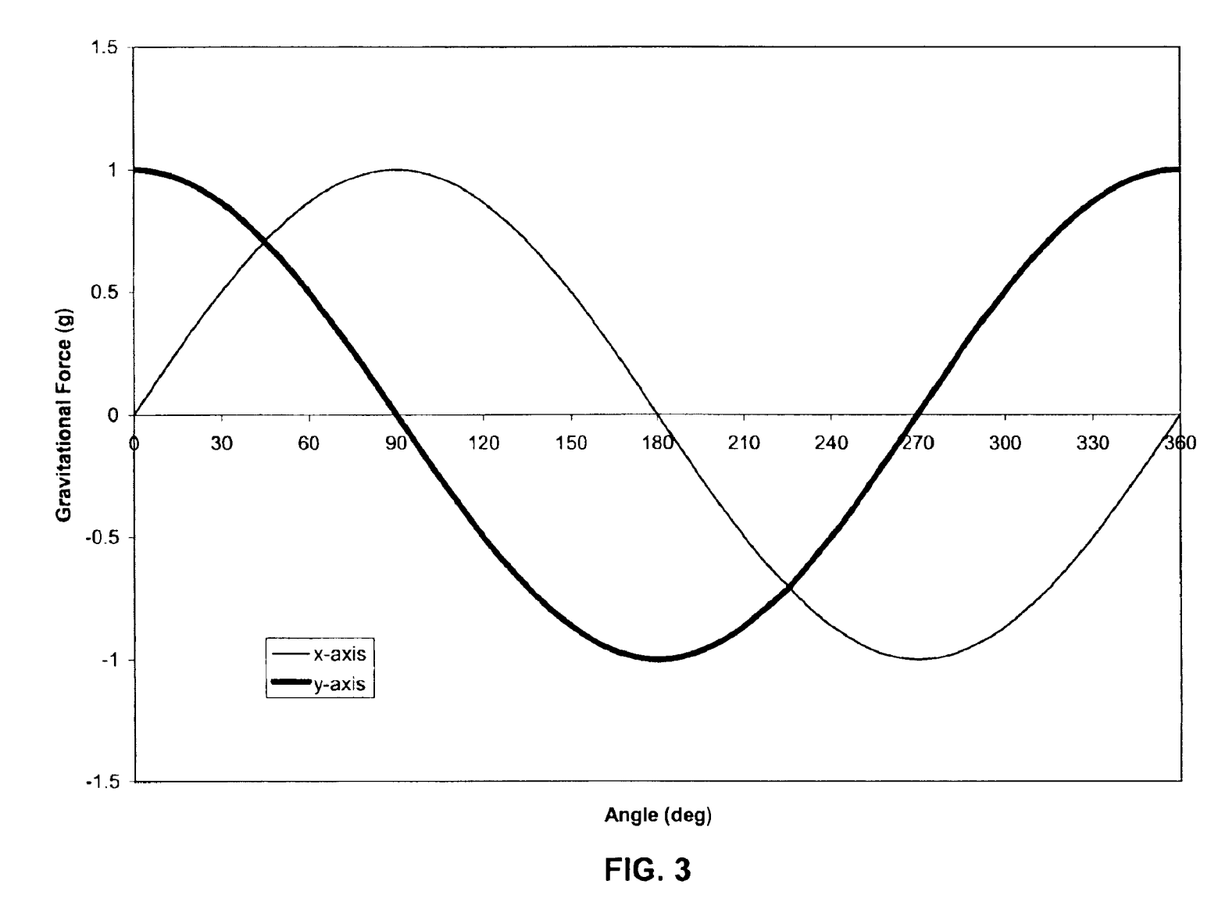
FIG. 3 shows a plot of x-axis and y-axis acceleration data generated by an accelerometer mounted in the center of a wheel in an embodiment of the present invention.

As the wheel continues to rotate, the resulting force felt by the x-axis and y-axis will continue to cycle through a range from +1 to −1 in a sinusoidal fashion, offset by 90°. The result, as illustrated in FIG. 3, are two sinusoidal curves, the x-axis producing a sine curve, and the y-axis producing a cosine curve. One complete period of the curve or 360° corresponds to one complete revolution of the wheel 105. Similarly, a partial period of the curve corresponds to a partial rotation of the wheel.

If the accelerometer 110 is not located at the center 120 of the wheel, the force felt by the x-axis and y-axis sensors will ride on a centripetal acceleration reading that will vary with radial distance from the center of the wheel. For example at a given distance "R" from the center of the wheel the accelerometer will detect a constant force "F" due to the centripetal force of the spinning wheel. This force "F" will also vary with the angular velocity of the wheel. As such, F is only constant for a given velocity.

Figure 4:
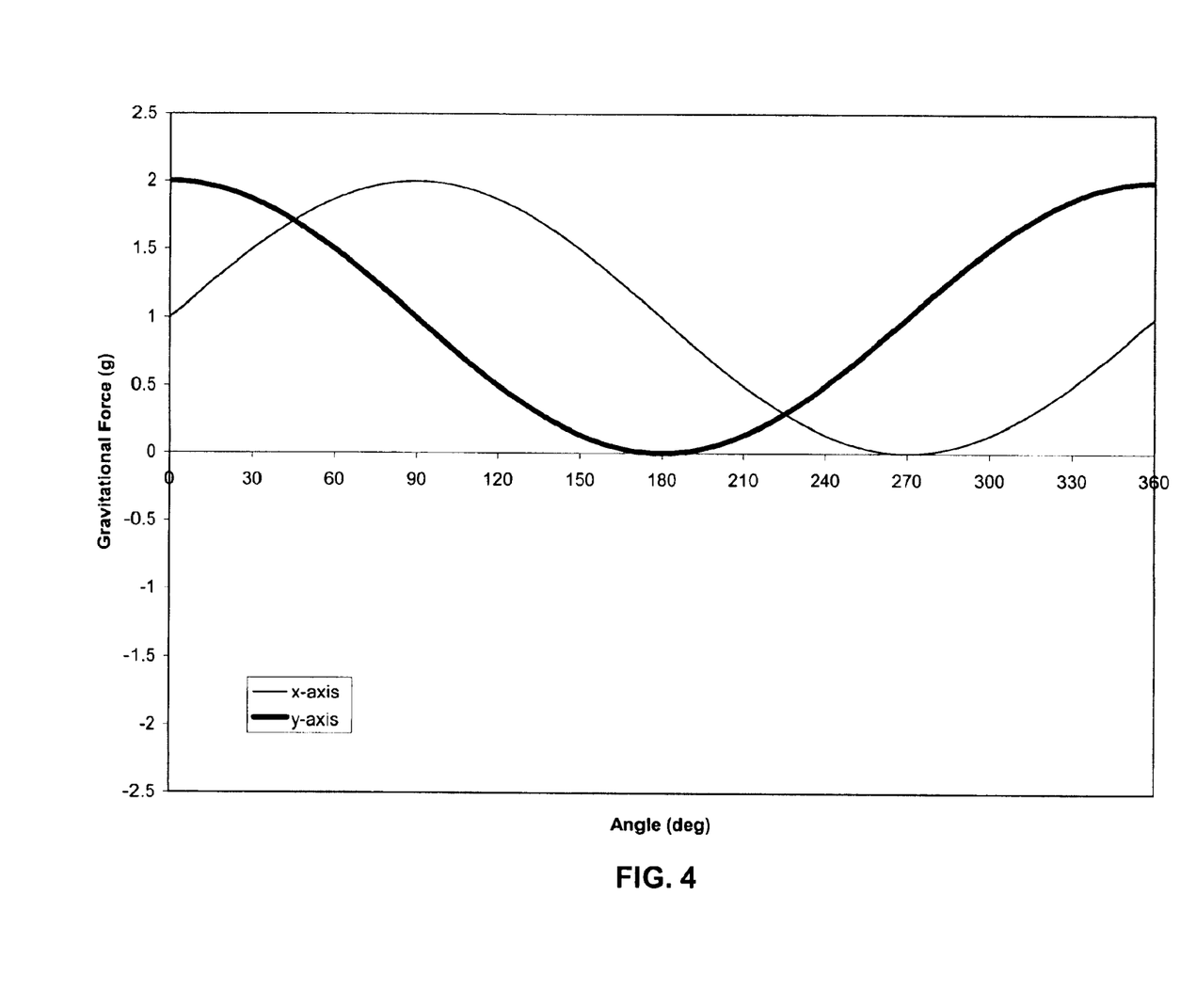
FIG. 4 shows a plot of x-axis and y-axis acceleration data generated by an accelerometer mounted at a distance R from the wheel center in an embodiment of the present invention.

In addition to the velocity dependant centripetal force, the sensors will detect the cyclical gravitational force of +/−1 g, as discussed above. Therefore, in an embodiment of the present invention wherein the accelerometer is mounted away from the center of the wheel, the same sinusoidal pattern will be reported by the accelerometer, only it will have "shifted" due to the centripetal acceleration experienced by the sensors. This is illustrated in the acceleration plot in FIG. 4 in which the centripetal acceleration produces a constant 1 g of force, and the force due to gravity cycles through the +/−1 sinusoidal pattern. This is assuming a constant angular velocity throughout the plot.

The output of the accelerometer x-axis and y-axis sensors is a DC voltage that varies with measured force. Thus, a full rotation of the wheel is represented by a sine or cosine wave of DC voltage as output from the accelerometer. The odometer count of wheel revolutions is equivalent to the number of periods of the curve.

In a further embodiment of the present invention, once the acceleration signal is generated by the accelerometer, it is communicated to a printed circuit board or other such device to be converted to a suitable format through the electronic components of the odometer. The signal coming from the accelerometer is a DC voltage that is proportional to the force exerted on the accelerometer. As discussed previously, this is a sinusoidal wave, however impacts and other disturbances will cause spikes and other anomalies in the curve. These irregularities in the curve will add inaccuracies to the odometer data if not corrected. Electronic data manipulation is performed to interpret this signal from the accelerometer, correct for spikes and abnormalities in order to increase the accuracy of the data. Once the accelerometer data is "clean", the microcontroller can calculate other useful data such as velocity, acceleration of the wheel, and rotation counts.

Mileage is equivalent to the wheel revolution count multiplied by the circumference of the wheel. Velocity and acceleration are calculated from the accelerometer output coupled with a timer means, such as a clock incorporated in to the microcontroller. Velocity is calculated by dividing the mileage by time. Thus, velocity is proportional to the period of the sinusoidal curve. Acceleration is measured by the change in the period of the sinusoidal curve for a given time. Thus, a constant period of the curve indicates a constant velocity, while changes in the period of the curve are representative of acceleration.

Figure 5:
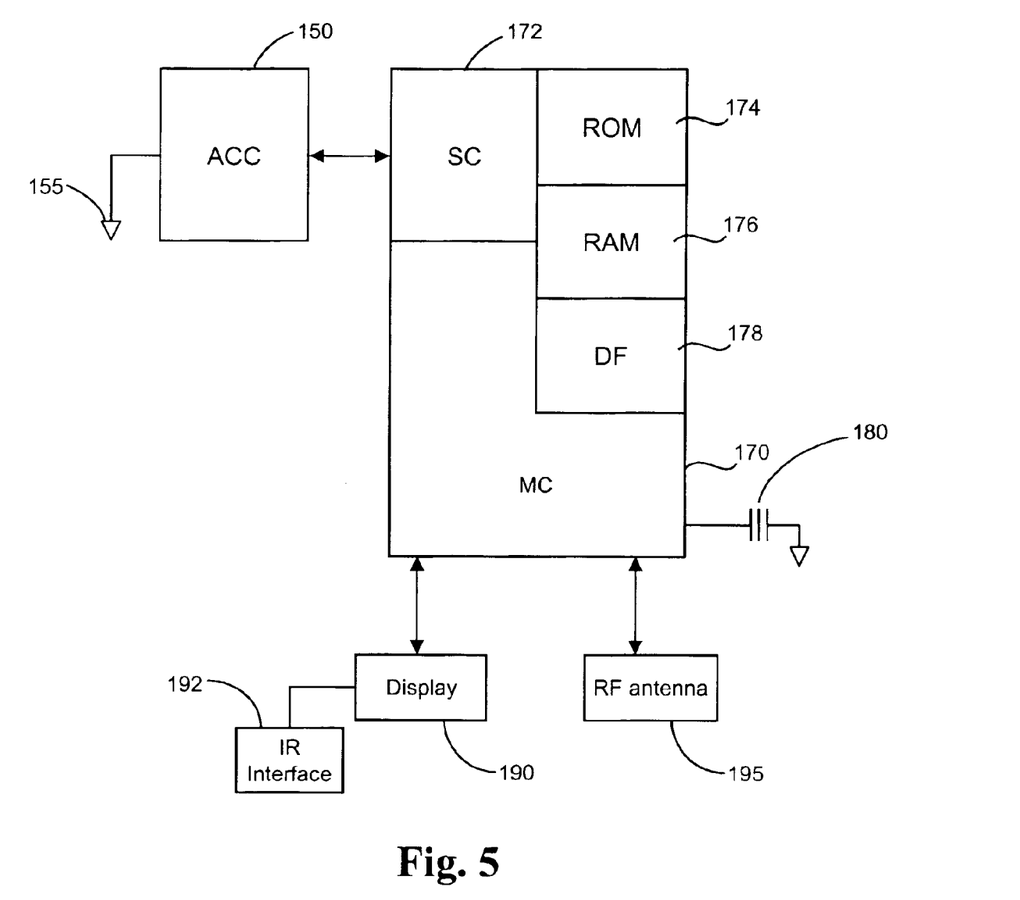
FIG. 5 shows a diagram of the electronic components comprising one embodiment of the present invention.

Referring to FIG. 5, the circuit board comprises a controller, which in a preferred embodiment of the present invention comprises a microprocessor or microcontroller 170 having internal read-only memory (ROM) 174 and random access memory (RAM) 176. The ROM 174 stores the operating program including the impact adjustment program and any communications programs, as well as other accelerometer and odometer data. The RAM 176 is employed as a temporary "operating" memory wherein accelerometer readings and other odometer data is stored. Additionally, a permanent memory (not shown) is provided to backup data and prevent loss in the event of a power failure. In a preferred embodiment of the present invention, the microcontroller comprises an ultra-low-power microcontroller, for example, part number MSP430F133, manufactured by Texas Instruments Incorporated, Dallas, Tex.

When the accelerometer senses changes in the gravitational force indicating the wheel is rotating, the x-axis and y-axis acceleration signals are passed to the microprocessor that converts the sine and cosine voltage patterns into angular readings. However, these readings are easily distorted since any impact 140 to the wheel is also detected by the accelerometer. For even small impacts, the magnitude of the impact and its frequency will be many times the force of gravity. In some tests, it has been observed that the impacts felt by a semi trailer wheel are approximately 6–8 g's of acceleration during 20–30 percent of operation.

Additionally, there are occasional large impacts, which can exert a force on the wheel of 30 g or more. The preferred accelerometer chosen for use in the present invention is particularly well suited to detect the +/−1 g of gravitational force. Therefore, large impacts can greatly distort the accelerometer readings and render the sensors "blind", or unable to transmit meaningful data for a short period of time.

The microcontroller performs signal-conditioning functions 172 to convert the incoming accelerometer signal into a machine friendly format, preferably a digital signal. Once the signal is digitized, it is electronically manipulated to reduce or eliminate the noise created by wheel impacts and vibrations. In one embodiment of the present invention, this is accomplished through digital filtering 178.

In one embodiment of the present invention, the digital filtering 178 is performed by an adaptive frequency filter. This digital filter allows the electronic hubodometer to accurately measure wheel rotation under a vast array of road conditions. The adaptive frequency is calculated through the use of a digital phase locked loop operating on the two quadrature sine and cosine waveforms. The quadrature nature of the two waveforms allows for speed locking in spite of impacts since the impacts will cause perturbations that are phase coherent and therefore can be filtered out. The impact amplitude will vary based on which axis is more closely aligned with the point of impact. Additionally the impact amplitude will vary generally with wheel speed because higher wheel speeds will cause impacts that are more forceful.

When the wheel is rotating slowly, and impacts are relatively small, the system is phase locked to the wheel rotation and a digital bandpass filter is implemented. Since the system is phase locked to the wheel rotation, the sample rate of the filter will vary with the rotational speed. Thus, the filter adapts to the wheel frequency. The filter then attenuates impacts that would otherwise distort the angular readings of the wheel.

Figure 7:
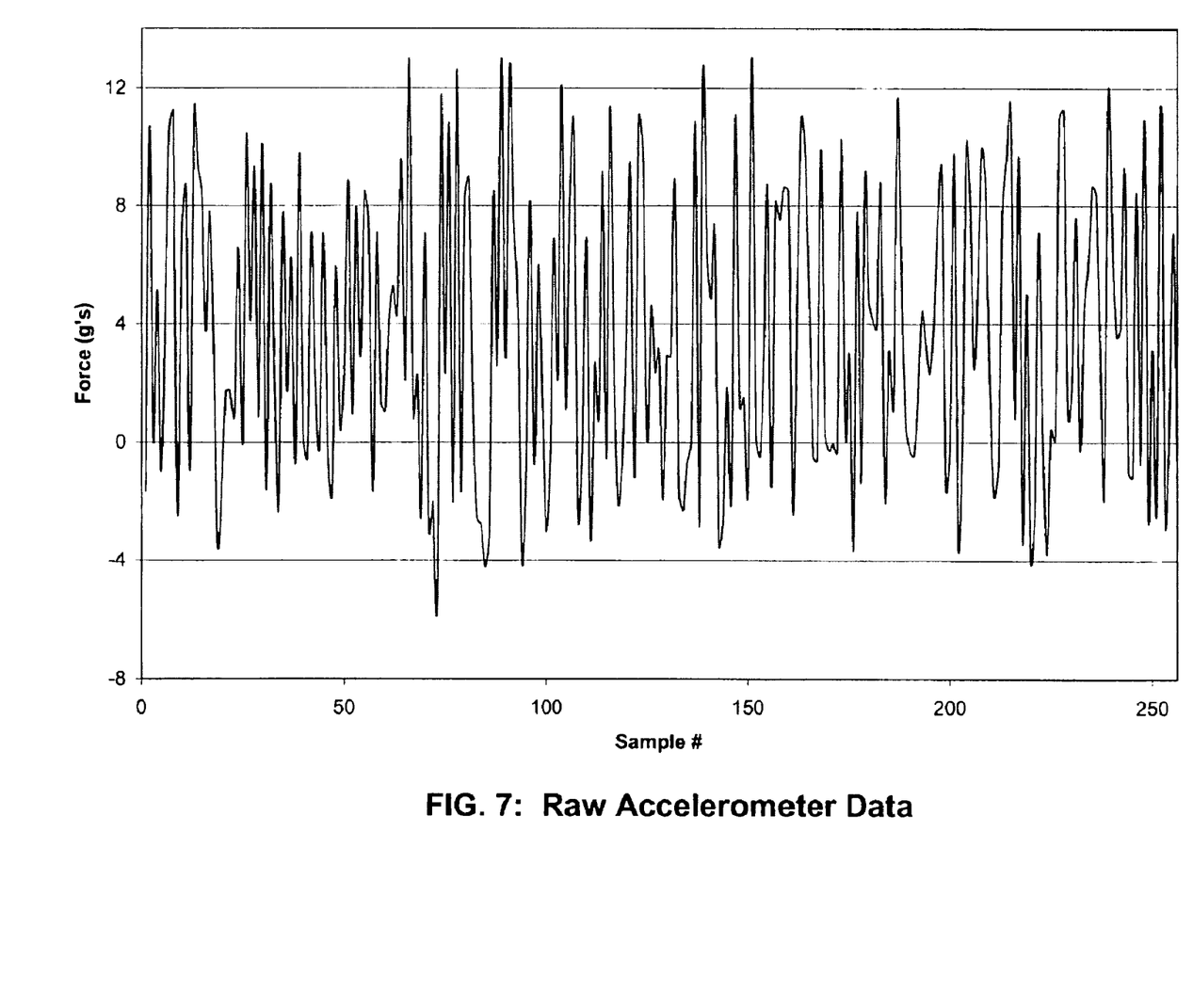
FIG. 7 shows the measured force sensed by one axis of an accelerometer in an embodiment of the present invention.
Figure 8:
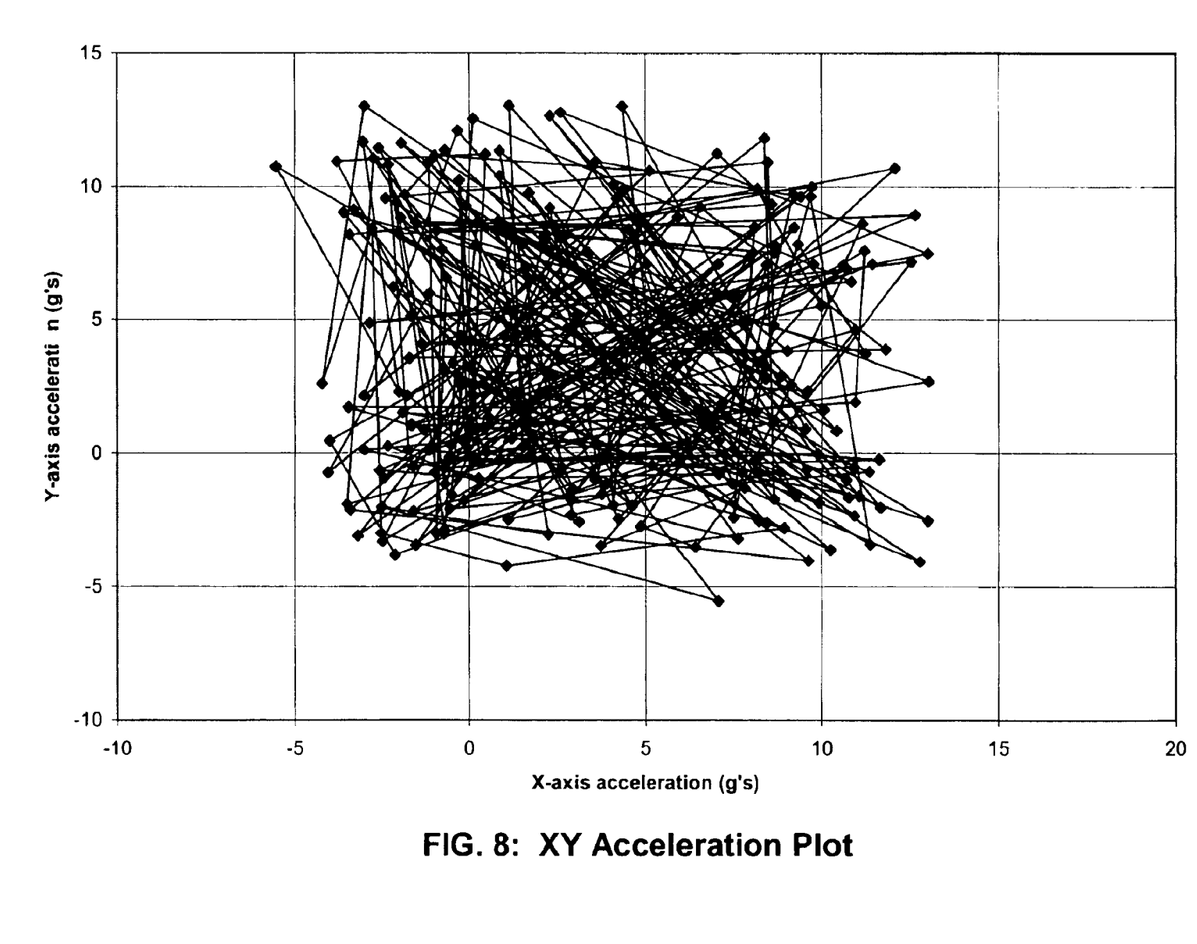
FIG. 8 is a plot of x-axis vs. y-axis sensor data received from an accelerometer in an embodiment of the present invention.
Figure 9:
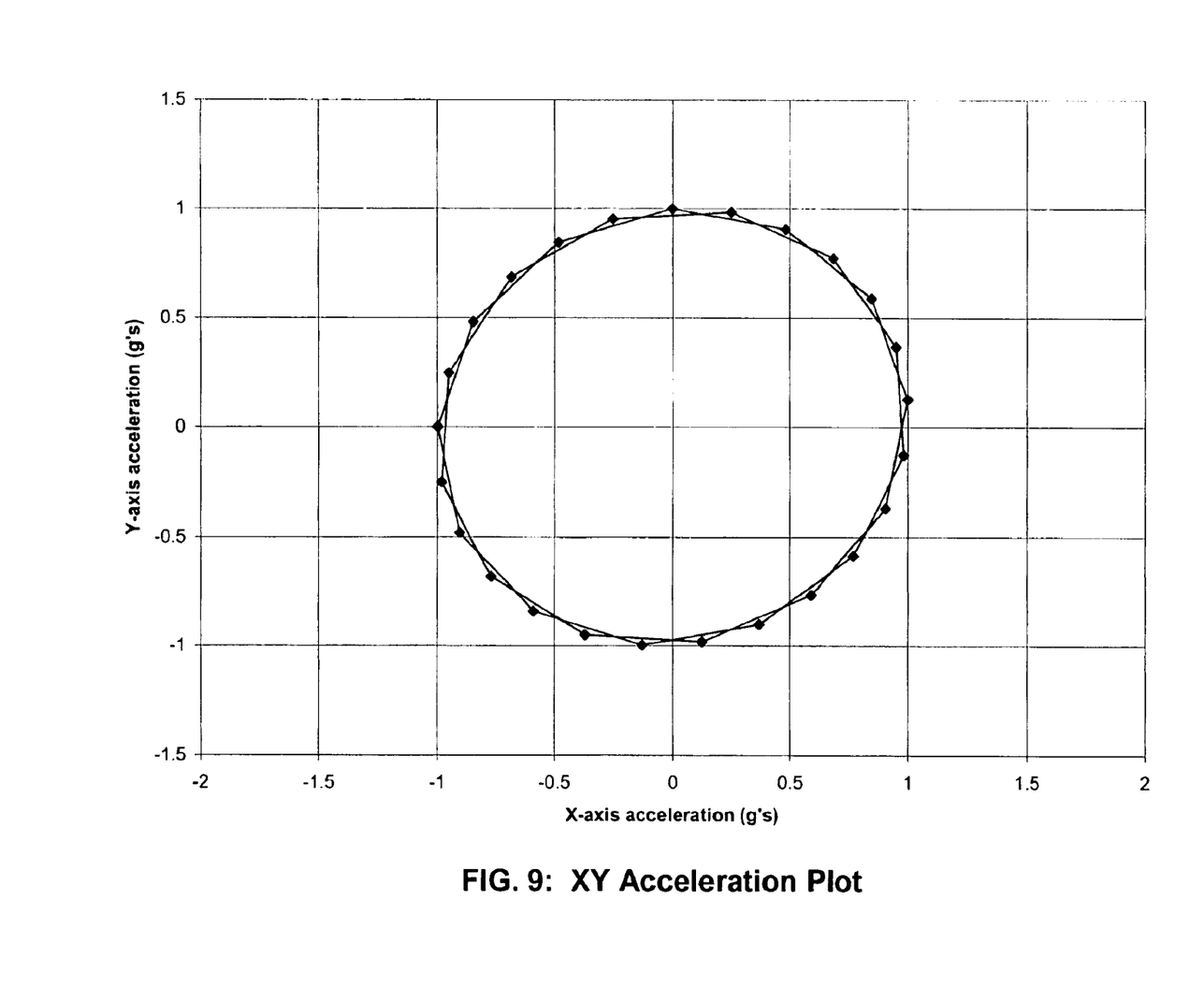
FIG. 9 is a plot of x-axis acceleration vs. y-axis acceleration after digital filtering in an embodiment of the present invention.

To illustrate the problem of impacts distorting accelerometer measurements, test data shown in FIGS. 7–9 is provided. FIG. 7 shows raw accelerometer data received from one of the sensors. As can be seen, there is a relatively constant 4 g's due to centripetal acceleration, with the sinusoidal wave imposed therein. Impacts cause the force to spike 6–8 g's quite regularly.

FIG. 8 is a plot of x-axis vs. y-axis acceleration for a two-axis accelerometer of the present invention. As can be seen, the data points from the accelerometer signal generally form a circular pattern as would be expected; however, there is significant "noise" due to impacts and vibrations. FIG. 9 is a plot of the same data as FIG. 8 after it has been digitally filtered to attenuate irregularities. Once the accelerometer signal has been filtered, revolution counts and other odometer data may be extracted.

There are circumstances and anomalies in accelerometer data that advanced digital filtering cannot rectify. Depending on the sensitivity and range of measurement of the accelerometer, there may be instances where the accelerometer experiences blindness. For example, when the wheel impacts 140 a large object at a high rate of speed, the sensors can experience over 30 g on impact. This can result in a temporary saturation of the sensor and an impact signal that is unrestorable by the electronic filters.

To overcome this temporary blindness, the velocity and acceleration of the wheel are tracked by the on-board electronics and stored in memory. When a temporary blindness or otherwise irreconcilable accelerometer signal occurs, the stored data is used to estimate wheel rotation during the blind period. The accuracy of this estimation is improved by comparing post-blindness data to pre-blindness data to better interpolate the data lost during the period of blindness.

In a further embodiment of the present invention, a display means 190 is mounted on the front face of the hubodometer and operates in communication with the microcontroller 170. In a preferred embodiment of the present invention, the display means 190 comprises a display device such as a light emitting diode (LED), liquid crystal display (LCD) or other such low-power display. The microcontroller operates the display to make odometer readings and other data visually available to an observer. In a preferred embodiment of the present invention, the microcontroller enables the display to be visible only when the wheel is stationary. When the wheel is rotating and rotations are being sensed, the display is turned off to conserve power and further battery life. When the wheel is stationary, accelerometer readings indicate lack of rotation as well as orientation of the wheel. Since the hubodometer housing and display are fixed relative to the wheel, an inverted data signal also indicates the display is inverted. The microcontroller then inverts the data on the display such that it is oriented correctly and easily viewed by an observer.

In a further embodiment of the present invention, the system further comprises a power supply 180 to provide power to the accelerometer 150, microcontroller 170, display 190, and the various communication means 192, 195. Preferably, the battery is a high capacity, long life battery such as a lithium battery, that provides several years of operating power for the electronic components.

Battery life is further extended through efficient operation of the system by the microcontroller. When the wheel is rotating at a constant rate, the sample rate can be decreased to reduce power consumption because the data between samples is easily reconcilable. When the wheel is accelerating or decelerating, the sample rate is increased to more accurately track the changes in wheel speed. In a preferred embodiment of the present invention, as discussed above, the system is phase locked to the wheel speed. Thus, the accelerometer is turned on at a sample rate proportional to the wheel speed and/or acceleration. The system samples accelerometer data and interpolates between data points, similarly to the reconstruction of data during blindness. In doing so, the system reduces the overall power consumption while maintaining appropriate accuracy of the data.

When the system detects no change in the wheel's angular position, indicating the wheel has stopped, the display is turned on. Additionally, when the wheel stops, the system drops the sample rate of the accelerometer such that only occasional readings are taken while the vehicle is motionless. These adaptive power control techniques allow the system to use power less than one percent of the time over the life of the battery. This allows a small battery to last for extended periods of time, in some cases 10 years or more depending on the type of battery used.

In a further aspect of the present invention, a communication system is provided to communicate odometer information to a location remote from the wheel and allow the odometer to be programmed, calibrated, or otherwise controlled. The two preferred communication systems for use in the present invention include an infrared system and an RF communication system.

In a further embodiment of the present invention, the communication system comprises an infrared (IR) communication system. The IR communication system is in communication with the microcontroller and accessed through the display means. In a preferred embodiment of the present invention, the IR communication system is built into the microcontroller 170. An infrared LED and photosensor comprise the IR interface 192 and are incorporated into the display means 190, or otherwise mounted on the external surface of the hubodometer. IR communication systems have been used with hub-mounted odometers extensively. An example of such a system is found in U.S. Pat. No. 4,697,278 to Fleischer, hereby incorporated by reference in full.

In a further aspect of the present invention, hubodometer data is transmitted to a remote location through an RF communication system. Typically, such a system includes an interrogator at the remote location that generates a modulated or unmodulated radio frequency interrogation signal, and an RF "tag" incorporated into the hubodometer to receive the signal from the interrogator and communicate hubodometer data back to the interrogator.

The RF tag is activated when an RF signal is transmitted or broadcast from the interrogator and impinges the antenna on the tag. This signals the tag to activate. Electronic controls on the tag receive odometer information and communicate this information back to the interrogator by modulating the antenna on the tag according to a predetermined format. As additional RF energy from the interrogator impinges the antenna on the tag, a portion of that energy will be reflected back to the interrogator. The reflected energy will vary in form due to modulations in the antenna. The interrogator receives this reflected energy containing modulations from the tag's antenna and deciphers the modulations to extract odometer information.

This modulation of reflected RF energy is commonly known as RF backscatter communication. There are two types of radio frequency identification (RFID) devices that use RF backscatter methods: passive and semi-passive. There is a further method of RF communication known as active RFID wherein the tag comprises a transceiver capable of both receiving RF signals from the interrogator and actively transmitting RF signals back. Active-RFID has a greater broadcast range because the tag is generating and transmitting an active signal. However, active-RFID uses significantly more power and is less suitable for low-power battery operated systems.

Passive RF tags work by receiving energy from an interrogator and using the energy to power the electronic components on the tag. There is no battery or power source physically connected to the tag. The only power the tag receives is in the form of RF energy from the interrogator. Once the tag has absorbed enough energy to power the electronics, the tag communicates information to the interrogator by modulating its antenna characteristics to reflect energy back to the interrogator in a meaningful manner.

Passive RF tags operate inductively or through a direct electric field. The most common are inductive RF tags, which typically operate at a frequency of 13.25 MHz. Newer RF tags have been operating at higher frequencies that allow them to become capacitive in nature and take advantage of far field effects. These newer tags can operate at 915 MHz or 2.45 GHz; however, their typical range is still limited to about 3 meters.

Semi-passive RF systems comprise a tag connected to a power source such as a battery to provide power to the onboard electronics. It is important to note that in a semi-passive system the battery is not used to transmit a signal, but rather, only to operate the electrical systems on the RF tag. Since the battery powers the onboard circuitry, the interrogator only has to send enough power to alert the RF tag and provide RF energy for the backscatter communication. This greatly improves the range of the system because in the passive RF tag scenario described above, the onboard electronics use most of the power to run the electronics on the tag leaving little to be reflected back to the interrogator. Semi-passive systems generally operate in the 900 MHz and 2.45 GHz bands and have an operational range of over 100 meters in some applications. A preferred embodiment of the present invention comprises a semi-passive RF communication system.

Figure 6:
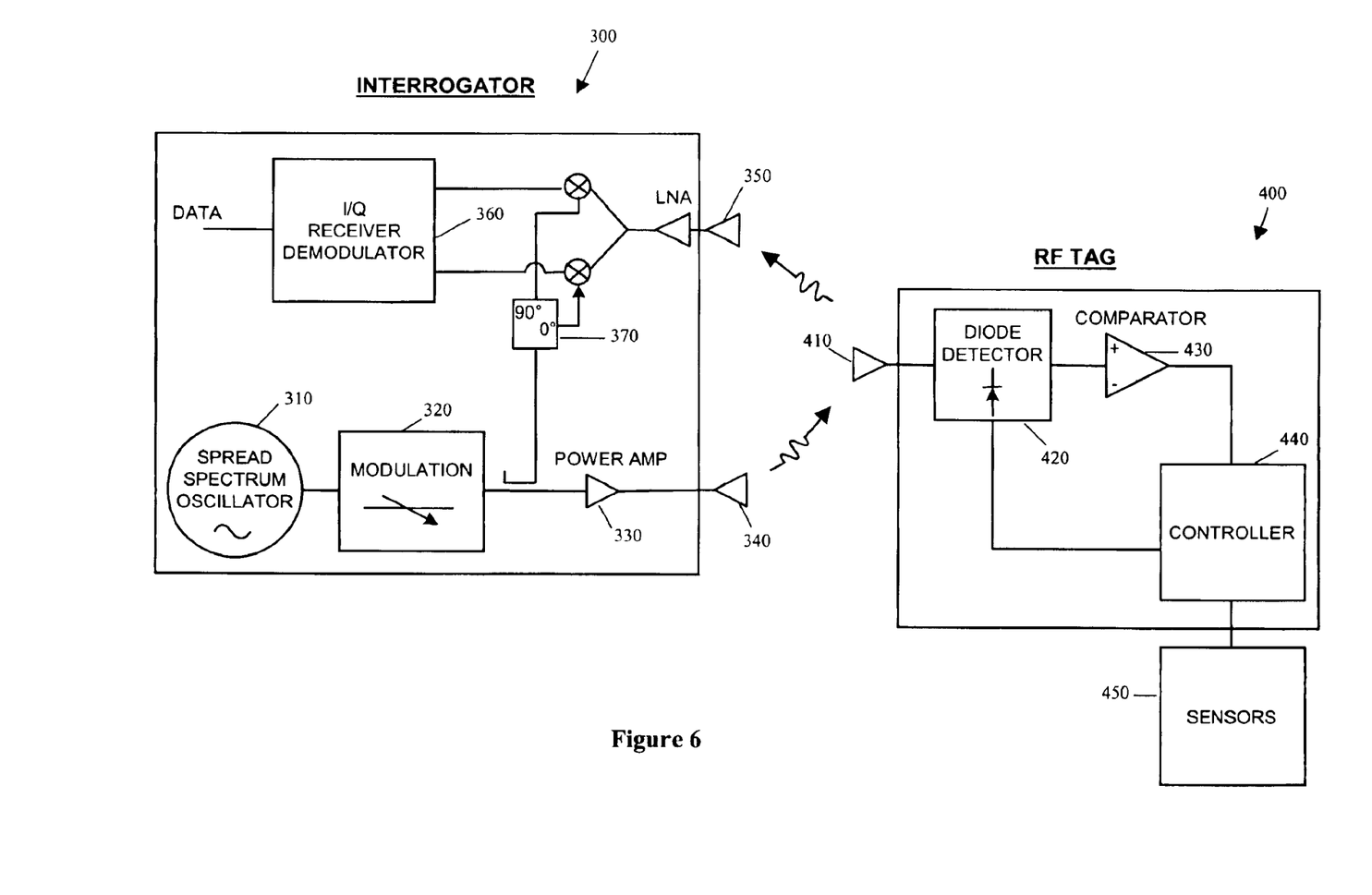
FIG. 6 shows a diagram of a typical RF backscatter communication system used in an embodiment of the present invention.

A typical interrogator 300 and tag 400 used in RFID systems of the present invention can be viewed in FIG. 6. The interrogator 300 comprises an oscillator 310 generates a signal at a frequency within the operating band of the RF tag 400. The signal is modulated by a frequency modulator 320 to encode instructions and otherwise communicate with the RF tag 400. In a preferred embodiment of the present invention, a simple modulation scheme is used to decrease the cost of the system. The most preferred modulation scheme is bi-phase modulation. However, other modulation schemes may be used in conjunction with the present invention. After modulation, the signal is split. One part of the signal is amplified in a power amplifier 330 and broadcast through an antenna 340. The other piece of the signal is sent to the demodulator 360 on the receive side of the interrogator.

The semi-passive RF tag 400 comprises an antenna 410, tuned to absorb energy in a predetermined band, diode detector 420 which rectifies the signal, turning the radio signal into a voltage, and comparator 430 that compares the voltage from the diode detector 420 to a set voltage or activation voltage. A battery (not shown) powers these electronic components thereby eliminating the need to receive and store power from the interrogator for the purposes of operating the on board electronics.

When the proper activation voltage is received by the RF tag, indicating that the interrogator is broadcasting a request for information, the comparator 430 signals the microcontroller 440 which times how long the energy impinges the antenna 410 and when it stops. The microcontroller 440 uses this data to determine the modulation of the signal and decoding the information sent from the interrogator. The tag then receives odometer information 450 for communication to the interrogator.

Once the interrogator 300 transmits the modulated command, the modulator 320 in the interrogator turns off and the interrogator 300 broadcasts unmodulated energy to the RF tag 400. The RF tag 400 uses this unmodulated signal to communicate back to the interrogator 300.

While the RF tag has been described as a separate system that receives odometer information from the odometer's microcontroller, it is within the scope of the present invention to incorporate the electronic controls of the RF tag into the microcontroller of the odometer. Further, in embodiments of the present invention comprising an RF communication system separate from the odometer system, the power source operating the accelerometer and odometer circuitry may be employed to operate the electronics of the RF tag.

The interrogator of the RF communication system is positioned proximate to the vehicle within range of the backscatter RF signal. Such locations may include the passenger compartment of the vehicle on which the odometer is mounted, a portable hand-held device, or the control center of a storage or maintenance yard where vehicles are kept.

In a still further embodiment of the present invention, information from the odometer is communicated from the interrogator to a wireless network such as a cellular or satellite network. In this embodiment, the interrogator is in communication with a network interface that allows the information to be further communicated throughout network. This would allow an observer to monitor information being communicated by the odometers. For example, a user at a central monitoring station would be able to monitor odometer readings for a vehicle or fleet of vehicles while the vehicles are dispersed along their routes.

Though the RF communication system as described herein has a limited operational range, once the information is transmitted to the network, that network will provide the necessary communication to any location in the world with such network capabilities. In a preferred embodiment of the present invention, the network comprises the Internet. Once this information is available through the Internet, it is accessible from almost any location through hand held wireless devices such as Personal Digital Assistants or laptop computers.

Although the present invention has been described with reference to particular embodiments, it should be recognized that these embodiments are merely illustrative of the principles of the present invention. Those of ordinary skill in the art will appreciate that the apparatus, system and methods of the present invention may be constructed and implemented in other ways and embodiments. Accordingly, the description herein should not be read as limiting the present invention, as other embodiments also fall within the scope of the present invention.

What is claimed is:

1. A wheel-hub mountable odometer comprising:
   an accelerometer comprising sensor means for sensing force, wherein the sensor means are operable to sense a force acting thereon and generate an electrical signal representative of said force sensed by the sensor means, and wherein the signal is proportional to the number of wheel rotations of the wheel and
   an electronic control system comprising a microcontroller and a power source for interpreting the signal from the accelerometer and calculating wheel rotations:
   wherein said microcontroller is programmed with power control means to reduce the power consumed by the electronic system.

2. The odometer of claim 1 wherein the accelerometer comprises a dual axis accelerometer capable of sensing force along two axes.

3. The odometer of claim 2 wherein the two axes of the accelerometer are offset by 90°.

4. The odometer of claim 1 wherein the electronic control system further comprises electronic filters to attenuate irregularities in the accelerometer signal.

5. The odometer of claim 4 wherein the electronic filters comprise an adaptive frequency filter wherein the adaptive frequency is calculated through the use of a digital phase locked loop, and a bandpass filter attenuates irregularities in the accelerometer signal due to wheel impacts.

6. The odometer of claim 1 wherein the odometer further comprises a display in communication with the electronic control system.

7. An odometer communications system comprising the odometer of claim 1 coupled to a communication system operable to communicate odometer information to a remote location.

8. The odometer communications system of claim 7 wherein the communication system further comprises means to communicate instructions to the odometer.

9. The odometer communications system of claim 8 wherein the communication system comprises an infrared communication system comprising an infrared LED and photosensor coupled to the microcontroller.

10. The odometer communications system of claim 7 wherein the communication system comprises an RF communication system.

11. The odometer communications system of claim 10 wherein the RF communication system comprises an interrogator remote from the wheel, and an RF tag in communication with the microcontroller of the odometer.

12. An odometer communications system for a wheel-hub mountable odometer comprising:
    an accelerometer comprising sensor means for sensing force, wherein the sensor means are operable to sense a force acting thereon and generate an electrical signal representative of said force sensed by the sensor means, and wherein the signal is proportional to the number of wheel rotations of the wheel; and
    an electronic control system comprising a microcontroller and a power source for interpreting the signal from the accelerometer and calculating wheel rotations;
    wherein said accelerometer and electronic control system are coupled to an RF communication system comprising an interrogator remote from the wheel, and an RF tag in communication with the microcontroller of the odometer; and
    wherein said communication system is operable to communicate odometer information to a remote location.

13. The odometer communications system of claim 12 wherein the RF communication system comprises an active RF system capable of actively transmitting data from the odometer to the remote interrogator.

14. The odometer communications system of claim 12 wherein the RF communication system comprises an RF backscatter communication system.

15. The odometer communications system of claim 12 wherein the interrogator is functionally connected to a wireless network and wherein the odometer data communicated from the odometer to the interrogator is further communicated to the wireless network.

16. The odometer communications system of claim 12 wherein the interrogator is functionally connected to the Internet.

17. The odometer of claim 12 wherein the electronic control system further comprises electronic filters to attenuate irregularities in the accelerometer signal.

18. The odometer of claim 17 wherein the electronic filters comprise an adaptive frequency filter wherein the adaptive frequency is calculated through the use of a digital phase locked loop, and a bandpass filter attenuates irregularities in the accelerometer signal due to wheel impacts.

19. The odometer communications system of claim 12 wherein the communication system comprises an IR communication system comprising an infrared LED and photosensor coupled to the microcontroller.

20. A method for counting wheel revolutions comprising:
    attaching an electronic accelerometer to a wheel, the accelerometer comprising sensor means for sensing a force acting on the accelerometer and generating an accelerometer signal comprising an electronic signal proportional to the force; and
    providing an electronic control system comprising a microcontroller and a power source functionally connected to the accelerometer, comprising means for converting the accelerometer signal into a wheel revolution count;

providing an RF communication system comprising an interrogator remote from the wheel, and an RF tag in communication with the electronic control system;

wherein the signal generated by the accelerometer is sent to the electronic control system which computes odometer data comprising the wheel revolution count based on the signal from the accelerometer, and said RF communication system communicates said odometer data to a remote location.

21. The method of claim 20 wherein the accelerometer further comprises a dual axis electronic accelerometer, and said accelerometer senses force along the two axes and generates electrical signals proportional to the sensed forces.

22. The method of claim 20 wherein the RF communication system is functionally connected to a network, and said odometer data is communicated to the network and available to a plurality of locations through said network.

23. The method of claim 22 wherein the network comprises a wireless network.

24. The method of claim 23 wherein the network comprises the Internet.

25. An odometer communications system for a wheel-hub mountable odometer comprising:

an accelerometer comprising sensor means for sensing force, wherein the sensor means are operable to sense a force acting thereon and generate an electrical signal representative of said force sensed by the sensor means, and wherein the signal is proportional to the number of wheel rotations of the wheel; and an electronic control system comprising a microcontroller and a power source for interpreting the signal from the accelerometer and calculating wheel rotations;

wherein said accelerometer and electronic control system are coupled to a communication system operable to communicate odometer information to a remote location, and wherein said communication system further comprises means to communicate instructions from a remote location to the odometer.

26. The odometer of claim 25 wherein the electronic control system further comprises electronic filters to attenuate irregularities in the accelerometer signal.

27. The odometer of claim 26 wherein the electronic filters comprise an adaptive frequency filter wherein the adaptive frequency is calculated through the use of a digital phase locked loop, and a bandpass filter attenuates irregularities in the accelerometer signal due to wheel impacts.

28. The odometer communications system of claim 25 wherein the communication system comprises an IR communication system comprising an infrared LED and photosensor coupled to the microcontroller.

29. The odometer communications system of claim 25 wherein the communication system comprises an RF communication system.

30. The odometer communications system of claim 29 wherein the RF communication system comprises an interrogator remote from the wheel, and an RF tag in communication with the microcontroller of the odometer.

* * * * *